US006500366B2

United States Patent
Evans

(10) Patent No.: US 6,500,366 B2
(45) Date of Patent: Dec. 31, 2002

(54) MULTI-INJECTION HEAD FOR WINDSHIELD CHIP AND CRACK REPAIR

(76) Inventor: Timothy D. Evans, 20225 True Vista Cir., Monument, CO (US) 80132

( * ) Notice: Subject to any disclaimer, the term of this patent is extended or adjusted under 35 U.S.C. 154(b) by 181 days.

(21) Appl. No.: 09/771,074

(22) Filed: Jan. 29, 2001

(65) Prior Publication Data

US 2002/0100991 A1 Aug. 1, 2002

(51) Int. Cl.$^7$ .................. B29C 73/02; B29C 73/24; B32B 35/00
(52) U.S. Cl. ............... 264/36.21; 264/36.22; 425/11; 425/12; 425/13; 156/94
(58) Field of Search .............. 425/11, 12, 13; 264/36.1, 36.18, 36.21, 36.22, 267; 156/94, 293; 65/28

(56) References Cited

U.S. PATENT DOCUMENTS

| | | | | |
|---|---|---|---|---|
| 3,765,975 A | * | 10/1973 | Hollingsworth | 156/94 |
| 3,993,520 A | * | 11/1976 | Werner et al. | 156/103 |
| 4,569,808 A | * | 2/1986 | Smali | 156/382 |
| 4,753,695 A | * | 6/1988 | Alexander et al. | 156/94 |
| 4,975,037 A | * | 12/1990 | Freiheit | 156/94 |
| 5,104,304 A | * | 4/1992 | Dotson | 156/94 |
| 5,116,441 A | * | 5/1992 | Campfield, Jr. | 156/94 |
| 5,122,042 A | * | 6/1992 | Einiger | 156/94 |
| 5,234,325 A | * | 8/1993 | Hill | 156/94 |
| 5,425,827 A | * | 6/1995 | Campfield | 156/94 |
| 5,429,692 A | * | 7/1995 | Campfield | 156/166 |
| 5,512,116 A | * | 4/1996 | Campfield | 156/94 |
| 5,589,018 A | * | 12/1996 | Campfield | 156/94 |
| 5,614,046 A | * | 3/1997 | Campfield | 156/94 |
| 5,837,294 A | * | 11/1998 | Shrimpton | 156/94 |
| 6,033,507 A | * | 3/2000 | Campfield | 156/94 |
| 6,050,799 A | * | 4/2000 | Galyon | 264/36.21 |
| 6,187,124 B1 | * | 2/2001 | Campfield | 156/94 |
| 6,422,849 B1 | * | 7/2002 | Grubb | 264/36.21 |

* cited by examiner

Primary Examiner—Angela Ortiz
(74) Attorney, Agent, or Firm—G. F. Gallinger

(57) ABSTRACT

Despite the disadvantage of reflexing a windshield, and consuming a multiple of the time taken with a single viscosity resin repair; it is generally accepted that most windshield repairs should utilize multiple viscosity resins. The multiple injection head not only eliminates the disadvantages associated with using resins of different viscosities, but additionally produces a smoother and stronger repair. The multiple injection head for injection of resins having different viscosities into a chip/crack comprises: a) a plunger housing having two upright cylindrical openings therethrough, each opening having an upper internally threaded portion and a lower chamber portion; and, b) two generally cylindrical plungers each having an upper portion adapted to be hand turned, and an intermediate portion matingly threaded with the openings. When the resins having different viscosities respectively fill the chamber portions, the plungers can be turned into the threaded portions of the openings controllably and selectively forcing the resins through the openings into a crack/chip therebelow on the windshield.

12 Claims, 1 Drawing Sheet

MULTI-INJECTION HEAD FOR WINDSHIELD CHIP AND CRACK REPAIR

FIELD OF THE INVENTION

This invention relates to the repair of stone chips and related cracks in automotive windshields. More particularly this invention relates to a repair resin head which consecutively injects resins having different viscosities.

BACKGROUND OF THE INVENTION

Automotive windshields frequently chip when they deflect small stones thrown off or up by moving vehicles immediately ahead on a roadway. Road vibration and temperature changes cause cracks first to diverge from these chips, and then spread across the windshield. After a crack has grown excessively, the windshield must be replaced.

Because the substantial replacement and labor cost of installing a new windshield can be saved by repairing the stone chip and small crack extending therefrom, many tools have been devised to inject resin into a stone chip and the crack extending therefrom. Most all of these tools have a resin injection head on one end portion, a suction hold down cup on a central portion, and a head pressure adjusting screw on the opposite end portion; so the tool, spaced from the windshield by the suction cup, and the injection head seated above the crack or chip, may be dragged along the crack injecting resin therein.

Many repair procedures comprise injecting resins of different viscosities into a chip and crack. It is difficult to fill a deep and wide chip with a relatively thin resin having a low viscosity. The resin runs out of the chip. Similarly it is difficult to penetrate a deep tight crack with a relatively thick resin having a high viscosity. Intermediate open portions of the crack can be filled first with thick resin and then finished with thin resin to ensure optimal bonding between the thick resin and the top edges of the crack. Secondary use of a thin resin also fills in voids and bubble openings in the thicker resin resulting in a stronger bond and smoother finish. Alternatively, bonding may be improved when the crack is first wetted with thinner resin, and then filled with thicker resin.

In all of these procedures which utilize resins of different viscosities it is necessary to set up, drag along, and remove the repair tool from the windshield more than once. In addition to being time consuming, it is particularly disadvantageous to flex the windshield along the crack any more than necessary because this flexing frequently causes cracks to grow.

OBJECTS OF THE INVENTION

It is an object of this invention to disclose a multi-injection head which facilitates injection of resins having differing viscosities into a chip and related crack. It is an object of this invention to disclose a multi-injection head which allows a chip and extending crack to be repaired with a single set up and pass of a repair tool thereby minimizing windshield flexing. It is yet a further object of this invention to disclose a multi-injection head which can be utilized in almost any existing windshield repair tool to better repair chips and related cracks. Cracks typically have variable width and stress therealong. For example, a crack may be closed, partially open, then open and closed again where it turns. The multi-injection head accommodates varying widths in cracks. The viscosity of the resin can be varied as the head is dragged along a crack having a variable width. Additionally, the head can be twisted to vary the order of injection of the thicker and thinner resins, as well as to more closely follow a turning crack.

One aspect of this invention provides for a multiple injection head for injection of resins having different viscosities into a chip/crack on an automotive windshield. The multiple injection head comprises: a) a plunger housing having a top side portion, a bottom side portion, and two cylindrical openings each extending from the top side portion through to the bottom side portion thereof, said openings each having an upper internally threaded portion and a lower chamber portion; and, b) two generally cylindrical plungers each having an upper portion adapted to be hand turned, an intermediate portion matingly threaded with respect to the housing, and a lower portion. When the resins having different viscosities respectively fill the chamber portions, the plungers can be turned into the threaded portions of the openings controllably and selectively forcing the resins through the openings out of the bottom side portion of the housing into a chip/crack therebelow on the windshield. As the head is dragged along the chip/crack first one viscosity resin is injected, and then the other different viscosity resin is immediately injected into the crack/chip producing an unusually smooth and strongly bonded crack in a single pass.

Within this specification chip/crack is defined to mean a chip and a related crack extending from the chip, or a crack alone, or a chip alone.

In a preferred aspect of the multi-injection head is adapted for use with a repair tool having an internally threaded head opening therein. Then the housing is generally cylindrical and a lower portion of the housing has a mating external thread therearound so that the head can screw into the repair tool; and subsequently, the head can be rotated for height adjustment, and be minimally rotated in the tool to facilitate following a curved crack in the windshield.

Various other objects, advantages and features of this invention will become apparent to those skilled in the art from the following description in conjunction with the accompanying drawings.

FIGURES OF THE INVENTION

Figure 1:
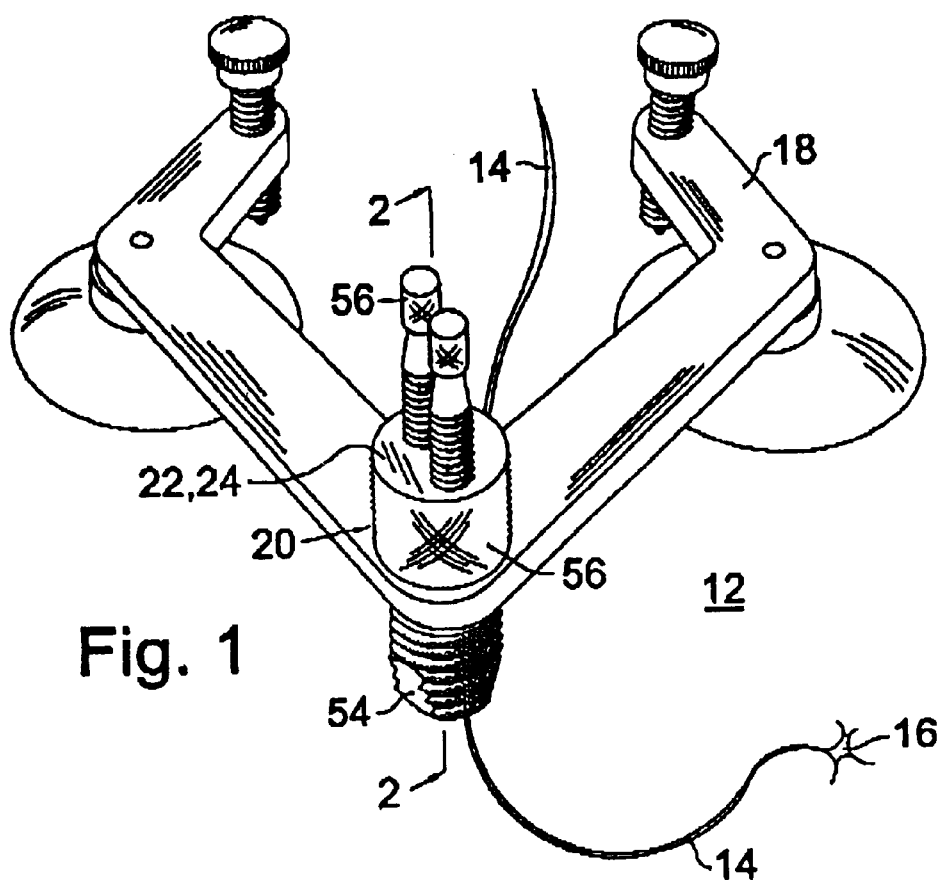
FIG. 1 is a perspective view of a windshield crack repair tool having a multi-injection head for injection of two resins of differing viscosities.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Figure 2:
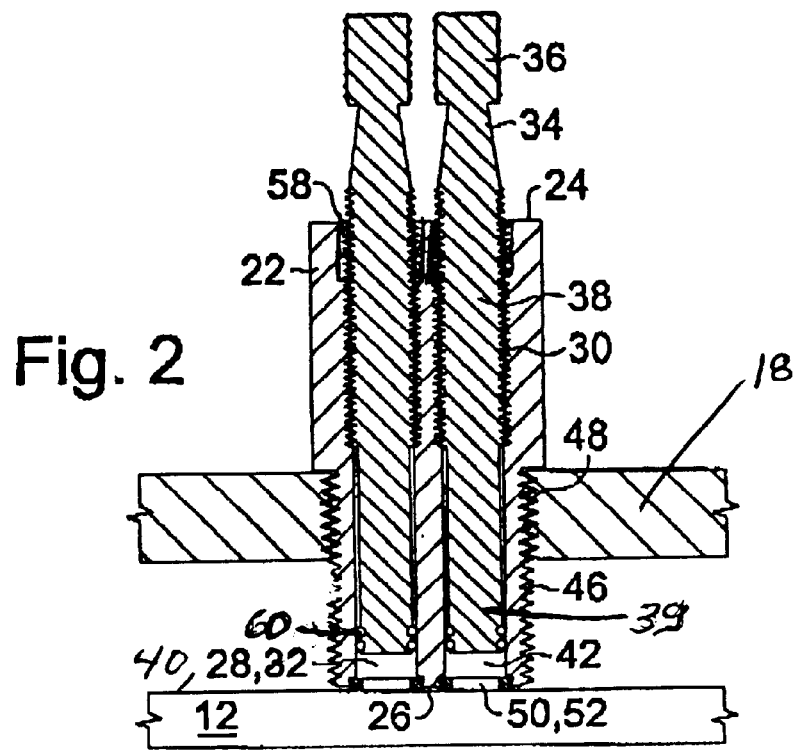
FIG. 2 is a cross sectional view of the multi-injection head taken along line 2—2 on FIG. 1.

Turning now to the drawings and more particularly to FIG. 1 we have a perspective view of a windshield crack repair tool 18 having a multi-injection head 20 for injection of two resins 16 of differing viscosities. The multiple injection head 20 is used to inject resin 16 into a chip 16 and/or crack 14 on an automotive windshield 12. Refer now to both FIG. 1 and FIG. 2. FIG. 2 is a cross sectional view of the multi-injection head taken along line 2—2 on FIG. 1.

The multi-injection head comprises: a plunger housing 22 having a top side portion 24, a bottom side portion 26, and two cylindrical openings 28 each extending from the top side portion 24 through to the bottom side portion 26. The openings 28 each have an upper internally threaded portion 30 and a lower chamber portion 32. There are two generally cylindrical plungers 34 each having an upper portion 36 adapted to be hand turned, an intermediate portion 38 matingly threaded with respect to the housing, and a lower portion 39. When resins 40,42 having different viscosities respectively fill the chamber portions 32, the plungers 34 can be turned into the threaded portions 30 of the openings 28 controllably and selectively forcing the resins 40,42 through the openings 28 out of the bottom side portion 26 of the housing 22 into a crack 14 or chip 16 therebelow on the windshield 12. As the head 20 is dragged along the crack 14 or chip 16 first one viscosity resin 40 is injected, and then the other different viscosity resin 42 is immediately injected into the crack 14 or chip 16.

Most preferably, the housing 22 is generally cylindrical and a lower portion thereof has an external thread 46 so after the head 22 is screwed into a repair tool 18 (which has a mating internal thread 48), the head 20 can be subsequently rotated for height adjustment, and be minimally rotated in the tool 18 to facilitate following a curved crack 14 in the windshield 12.

The bottom side portion 26 of the head 20 further comprises a windshield seal 50 which most preferably is a flanged soft plastic washer 52. A lower portion of the head 20 may be flattened 54 on opposite sides to indicate the alignment of the openings 28. And, the upper portion 36 of the plungers 34 may be marked to indicate the relative viscosities of the resins 40,42.

In the most preferred embodiment of the invention the upper portions 36 of the plungers 34 and the upper portion of the housing 22 are adapted for hand turning with a knurl 56. The uppermost portions of the openings 28 may be enlarged 58 to accommodate the upper portions 36 of the plungers 34 so that the upper portion 36 of the plungers 34 may be turned within the opening 28 to force substantially all resin 40,42 from the chamber portion 32 of the opening 28 in the housing 22.

The lower portion of the plungers 28 may further comprise a peripheral O ring 60 to prevent backflow of resin 40,42.

OPERATION OF THE INVENTION

With a multi-injection head a thinner resin 40 may be used for the initial and tight parts of a crack 14 thereby eliminating the necessity of pressing as forcefully to spread the crack 14 to gain penetration by the resin 40,42. When forceful pressing is not necessary the possibility of further damage to the windshield 12 during repair is minimized. When the repair tool 18 is pulled along the crack 14 the head 20 may be rotated to align it with the laterally shifting crack 14. If necessary the head 20 may be rotated back and forth to broaden the area of coverage. It is always advantageous to repair the crack 14 on a first pass thereover. This eliminates reflexing of the windshield 12 and prevents partial set up of the resin 40,42 in sunlight. Because voids in the thicker resin 42 are best smoothed by an immediately applied thinner resin 40, the repair is smoother and stronger. It has been found that two resins having viscosities of 20 c.p.s. and 145 c.p.s. work well together to repair long cracks having a small chip. It is not intended that viscosities of the different resins utilized be limited to these numbers or even limited within this range.

While the invention has been described with preferred specific embodiments thereof, it will be understood that this description is intended to illustrate and not to limit the scope of the invention, which is defined by the following claims.

I claim:

1. A multiple injection head for injection of resins having different viscosities into a chip/crack on an automotive windshield comprising:

a plunger housing having a top side portion, a bottom side portion, and two cylindrical openings each extending from the top side portion through to the bottom side portion thereof, said openings each having an upper internally threaded portion and a lower chamber portion;

two generally cylindrical plungers each having an upper portion adapted to be hand turned, an intermediate portion matingly threaded with respect to the housing, and a lower portion;

so that when the resins having different viscosities respectively fill the chamber portions, the plungers can be turned into the threaded portions of the openings controllably and selectively forcing the resins through the openings out of the bottom side portion of the housing into a chip/crack therebelow on the windshield;

so as the head is dragged along the chip/crack first one viscosity resin is injected, and then the other different viscosity resin is immediately injected into the chip/crack.

2. A multiple injection head as in claim 1 for use with a repair tool having an internally threaded head opening therein, wherein the housing is generally cylindrical and wherein a lower portion of the housing has a mating external thread therearound so that the head can screw into the repair tool; and subsequently, the head can be rotated for height adjustment, and be minimally rotated in the tool to facilitate following a curved crack in the windshield.

3. A multiple injection head as in claim 2 wherein a bottom side portion of the head further comprises a windshield seal.

4. A multiple injection head as in claim 3 wherein the windshield seal comprises a flanged soft plastic washer.

5. A multiple injection head as in claim 3 wherein a lower portion of the head is flattened on opposite sides to indicate the alignment of the openings.

6. A multiple injection head as in claim 3 wherein the upper portion of the plungers are marked to indicate the relative viscosities of the resins.

7. A multiple injection head as in claim 3 wherein the upper portions of the plungers and the upper portion of the housing are adapted for hand turning with a knurl.

8. A multiple injection head as in claim 3 wherein the uppermost portions of the openings are enlarged to accommodate the upper portions of the plungers so that the upper portion of the plungers may be turned within the opening to force substantially all resin from the chamber portion of the opening in the housing.

9. A multiple injection head as in claim 3 wherein the lower portion of the plungers further comprises a peripheral O ring to prevent backflow of resin.

10. A method of repairing a chip/crack in an automotive windshield comprising the following steps:

providing a repair tool having a multiple injection head as defined in claim 1;

dragging the mutiple injection head along and over the chip/crack in the windshield injecting resins of different viscosities into the chip/crack;

thereby bonding and repairing the windshield.

11. A method of repairing a chip/crack in an automotive windshield comprising the following steps:

providing a repair tool having a multiple injection head as defined in claim 2;

dragging the mutiple injection head along and over the chip/crack in the windshield injecting resins of different viscosities into the chip/crack;

thereby bonding and repairing the windshield.

12. A method of repairing a crack/chip in an automotive windshield comprising the following steps:

providing a repair tool having a multiple injection head for the injection of resins of different viscosities into the crack/chip;

dragging the mutiple injection head along and over the chip/crack in the windshield injecting resins of different viscosities into the chip/crack;

thereby bonding and repairing the windshield.

* * * * *